(12) United States Patent  (10) Patent No.: US 9,300,205 B2
Matsui  (45) Date of Patent: Mar. 29, 2016

(54) POWER SUPPLY APPARATUS, POWER SUPPLY SYSTEM AND POWER SUPPLY METHOD WITH AN ON/OFF OPERATION OF SUPPLYING POWER

(71) Applicant: ROHM CO., LTD., Kyoto (JP)

(72) Inventor: Shigekane Matsui, Kyoto (JP)

(73) Assignee: ROHM CO., LTD. (JP)

( * ) Notice: Subject to any disclaimer, the term of this patent is extended or adjusted under 35 U.S.C. 154(b) by 256 days.

(21) Appl. No.: 13/951,943

(22) Filed: Jul. 26, 2013

(65) Prior Publication Data

US 2014/0097819 A1   Apr. 10, 2014

(30) Foreign Application Priority Data

Jul. 27, 2012   (JP) .................................. 2012-166697

(51) Int. Cl.
*G05F 1/00* (2006.01)
*H02M 3/157* (2006.01)
*H02M 3/156* (2006.01)

(52) U.S. Cl.
CPC .............. *H02M 3/157* (2013.01); *H02M 3/156* (2013.01)

(58) Field of Classification Search
CPC ........... H02M 3/00; H02M 3/02; H02M 3/04; H02M 3/145; H02M 3/155; H02M 3/156; H02M 3/157

USPC ................. 323/234, 237, 241, 265, 273–274, 323/282–283

See application file for complete search history.

(56) References Cited

U.S. PATENT DOCUMENTS

| | | | | |
|---|---|---|---|---|
| 4,940,909 | A | * | 7/1990 | Mulder et al. .................... 326/38 |
| 5,235,699 | A | * | 8/1993 | Shaffer et al. .................. 713/502 |
| 2005/0285582 | A1 | * | 12/2005 | Azuma et al. ................. 323/282 |
| 2006/0012358 | A1 | * | 1/2006 | Moussaoui .................... 323/282 |
| 2011/0133799 | A1 | * | 6/2011 | Dunworth et al. ............. 327/157 |
| 2011/0156821 | A1 | * | 6/2011 | Ge .................................. 331/34 |
| 2012/0038341 | A1 | * | 2/2012 | Michishita et al. ........... 323/284 |

FOREIGN PATENT DOCUMENTS

| | | |
|---|---|---|
| JP | 2005512493 A | 4/2005 |
| JP | 2009071978 A | 4/2009 |

* cited by examiner

*Primary Examiner* — Jeffrey Gblende
(74) *Attorney, Agent, or Firm* — Cantor Colburn LLP (57) ABSTRACT

A power supply apparatus comprises a driver, an oscillator, a digital control circuit and a counter. The driver is connected to a power source voltage and performs an ON/OFF operation of supplying power to a load. The oscillator outputs an oscillator signal every constant period. The digital control circuit performs an ON/OFF control of the driver based on the oscillator signal outputted from the oscillator. The counter counts the oscillator signal outputted from the oscillator. The digital control circuit sets a threshold value representing an upper limit of a count value counted by the counter and stops an output operation of the oscillator signal by the oscillator when the count value counted by the counter exceeds the set threshold value.

11 Claims, 7 Drawing Sheets

POWER SUPPLY APPARATUS, POWER SUPPLY SYSTEM AND POWER SUPPLY METHOD WITH AN ON/OFF OPERATION OF SUPPLYING POWER

CROSS-REFERENCE TO RELATED APPLICATION

This application is based upon and claims the benefit of priority from Japanese Patent Application No. 2012-166697, filed on Jul. 27, 2012, the entire contents of which are incorporated herein by reference.

TECHNICAL FIELD

The present disclosure relates to a power supply apparatus, a power supply system and a power supply method, and in particular, to an adjustment of a setting being digitally executed (e.g., change of parameter or software) to thereby eliminate the need for a redesign according to the specifications or the environment of an equipment (a load) to which power is being supplied, without lowering the efficiency even when a small amount of power is supplied.

BACKGROUND

Generally, in a power conversion apparatus, particularly, in an apparatus for performing a DC power conversion, a power supply apparatus that controls electric power supplied to a load using an ON/OFF control of a switching element is well known.

The power supply apparatus may include an analog circuit system and a digital circuit system.

However, since the power supply apparatus of the conventional analog circuit system uses a switching power source realized by an analog circuit, it is difficult to change the setting of the power supply apparatus. Therefore, there is a problem when adjusting a ripple voltage or a switching frequency according to the specifications of the equipment of to which power is supplied.

Further, since a reference voltage, which is compared with a converter output voltage, is a fixed value in a digital controller for a high frequency voltage regulator of the power supply apparatus of the conventional digital circuit system, the reference voltage cannot be easily adjusted according to the specifications of the equipment to which power is supplied.

SUMMARY

Various embodiments for a power supply apparatus, a power supply system and a power supply method, which can execute an adjustment setting with only a digital setting (change of parameter or software) and eliminate the need for a redesign according to the specifications or the environment of the equipment to which power is supplied, without lowering the efficiency even when a small amount of power is supplied.

According to an aspect of the present disclosure, there is provided a power supply apparatus, comprising: a driver connected to a power source voltage and configured to perform an ON/OFF operation of power supply to a load; an oscillator configured to output an oscillator signal every constant period; a digital control circuit configured to perform an ON/OFF control of the driver based on the oscillator signal outputted from the oscillator; and a counter configured to count the oscillator signal by the oscillator, wherein the digital control circuit is configured to set a threshold value representing an upper limit of a count value counted by the counter, and stop an output operation of the oscillator signal by the oscillator when the count value counted by the counter exceeds the set threshold value.

According to another aspect of the present disclosure, there is provided a power supply method, comprising: an oscillation step of outputting an oscillator signal every constant period; a digital control step of performing an ON/OFF operation of power supply based on the oscillator signal outputted in the oscillation step; and a count step of counting the oscillator signal outputted in the oscillating step, wherein the digital control step comprises: setting a threshold value representing an upper limit of a count value counted in the count step; and stopping an output operation of the oscillator signal by the oscillator when the count value counted in the counting step exceeds the set threshold value.

DETAILED DESCRIPTION

Reference will now be made in detail to various embodiments, examples of which are illustrated in the accompanying drawings. In the following detailed description, numerous specific details are set forth in order to provide a thorough understanding of the present invention(s). However, it will be apparent to one of ordinary skill in the art that the present invention(s) may be practiced without these specific details. In other instances, well-known methods, procedures, systems, and components have not been described in detail so as not to unnecessarily obscure aspects of the various embodiments.

Next, embodiments of the present disclosure will be described with reference to the drawings. Throughout the drawings, same or similar elements are denoted by same or similar reference numerals.

The following embodiments are provided to illustrate devices and methods to embody the technical ideas of the present disclosure and are not intended to limit material, shape, structure, arrangement and so on of elements to those recited in the disclosed embodiments of the present disclosure. The disclosed embodiments may be modified in various ways without departing from the spirit and scope of the present disclosure set forth in the claims.

First Embodiment (Outline of Power Supply System)

Figure 1:
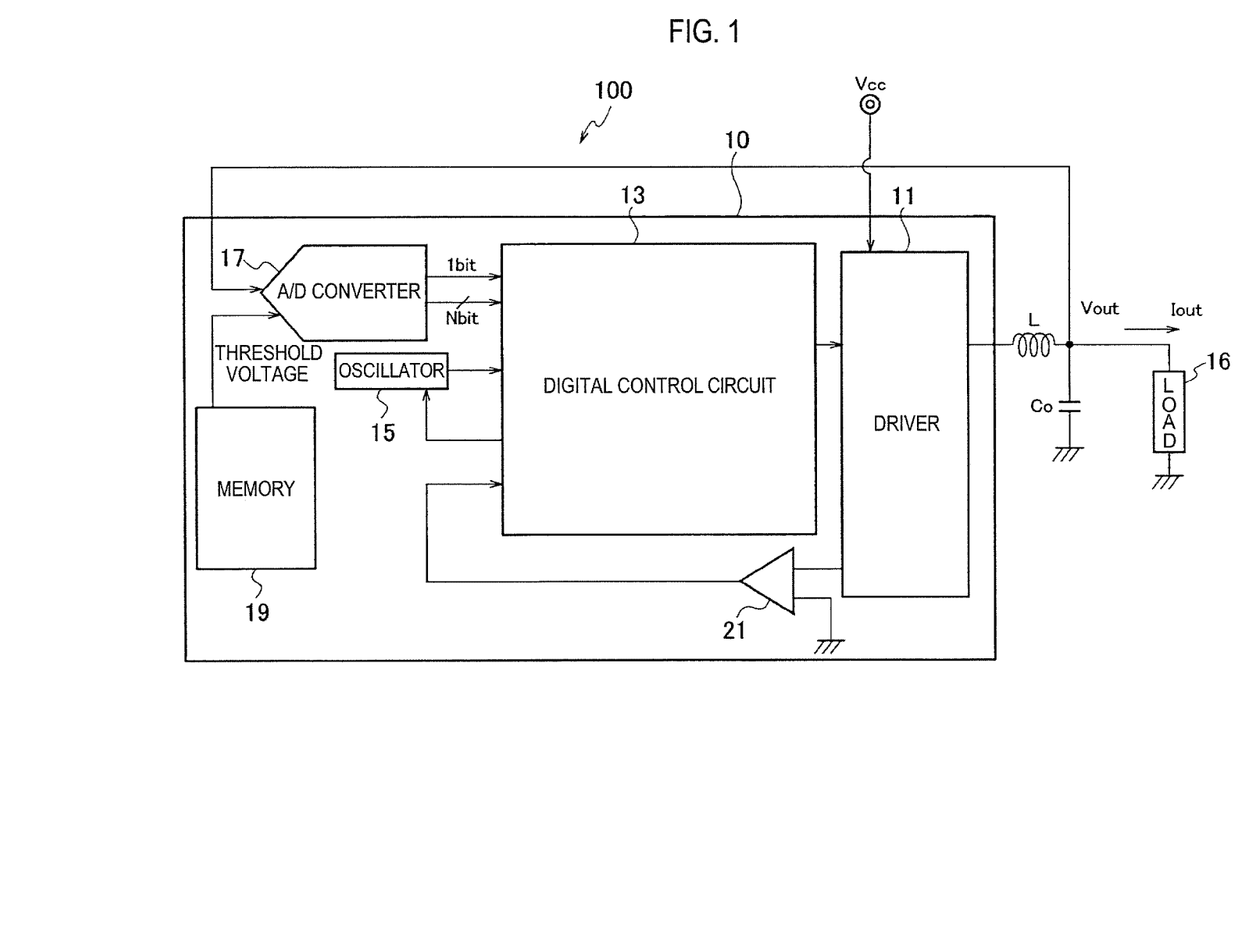
FIG. 1 is a schematic diagram showing a configuration of a power supply system according to a first embodiment.

FIG. 1 is a schematic diagram showing a configuration of a power supply system 100 according to a first embodiment. As shown in FIG. 1, the power supply system 100 according to the first embodiment includes a power supply apparatus 10, a coil L, a capacitor Co and a load 16. For example, the power supply apparatus 10 is a switching power source apparatus. The coil L is connected to the power supply apparatus 10. The capacitor Co and the load 16 are connected to the coil L. A power source voltage Vcc is inputted to the power supply apparatus 10 as an input power source voltage, and an output voltage Vout is outputted from a connection node of the capacitor Co and the coil L.

The power supply apparatus 10 is connected to the load 16 to supply power to the load 16. The load 16 may be, for example, a mobile device including a cellular phone, a smartphone, a personal digital assistant (PDA), an optical disk apparatus, a digital camera, a wireless communication apparatus and the like, or components thereof.

The power supply apparatus 10 includes a driver 11, a digital control circuit 13, an oscillator 15 and a comparator 21. The driver 11 is connected to the power source voltage Vcc and performs an ON/OFF operation of the power supply to the load 16. The digital control circuit 13 performs an ON/OFF control of the driver 11. The oscillator 15 outputs an oscillator signal for turning on/off the driver 11 to the digital control circuit 13 every constant period, for example, every clock period of 1 MHz. The comparator 21 detects an output current of the driver 11.

The digital control circuit 13 has a normal control mode and a low power control mode. In the normal control mode, an output operation of the oscillator signal by the oscillator 15 and the ON/OFF operation of the driver 11 are performed continuously. In the low power control mode, the output operation of the oscillator signal by the oscillator 15 and the ON/OFF operation of the driver 11 are performed intermittently.

The digital control circuit 13 sets the switching between the normal control mode and the low power control mode based on a current detected by the comparator 21, and controls the driver 11 and the oscillator 15 based on the set control mode.

The digital control circuit 13 stops the output operation of the oscillator signal by the oscillator 15 and the ON/OFF operation of the driver 11 when the digital control circuit 13 is switched from the normal control mode to the low power control mode. Specifically, the digital control circuit 13 is switched from a continuous operation state in the normal control mode to an intermittent operation state in the low power control mode only when it is necessary.

The oscillator 15 outputs the oscillator signal (clock period signal) for turning ON/OFF the driver 11 to the digital control circuit 13. The oscillator 15 has a function of turning on and off the output of the oscillator signal. The oscillator 15 continuously outputs the clock period signal (always EN signal ON) in the normal control mode, and intermittently outputs the clock period signal in the low power control mode. That is, the oscillator 15 outputs the clock period signal when the EN signal is ON and stops the clock period signal when the EN signal is OFF in the low power control mode thereby enabling an intermittent operation.

The power supply apparatus 10 includes an A/D converter 17. The A/D converter 17 compares the output voltage Vout outputted from the connection node of the coil L, which is current controlled by the driver 11, and the capacitor Co, which is connected to the coil L, with a predetermined threshold voltage VTH.

The digital control circuit 13 starts the ON/OFF operation of the driver 11 when the low power control mode is set and the output voltage Vout is equal to or less than the threshold voltage VTH by a comparison result of the A/D converter 17.

The digital control circuit 13 stops the output operation of the oscillator signal by the oscillator 15 and then activates the output operation after a predetermined time, when the low power control mode is set.

Specifically, the digital control circuit 13 turns on the driver 11 immediately when the output operation of the oscillator signal of the oscillator 15 is stopped and a lowered voltage condition (i.e., the condition that the output voltage Vout is equal to or less than the threshold voltage VTH) is detected by the A/D converter 17. When the driver 11 is activated for the predetermined time and the output value of the A/D converter 17 is reversed (i.e., the output voltage Vout becomes equal to or more than the threshold voltage VTH), the digital control circuit 13 turns off the driver 11. That is, the digital control circuit 13 activates the output operation of the oscillator signal of the oscillator 15 for the predetermined time and stops the output operation when the output voltage Vout is determined to be equal to or more than the threshold voltage VTH by the comparison result of the A/D converter 17. The ON/OFF operation may be repeated for the predetermined time.

When the low power control mode is set, the digital control circuit 13 activates the output operation and sets the normal control mode if the number of times that the output operation of the oscillator signal by the oscillator 15 is consecutively stopped reaches a predetermined consecutive repetitive number of times. That is, the control mode of the digital control circuit 13 is switched from the low power control mode to the normal control mode and a continuous operation is performed, when the number of times that the output operation of the oscillator signal by the oscillator 15 is consecutively stopped reaches the predetermined consecutive repetitive number of times.

(Detailed Configuration of Power Supply Apparatus)

The configuration of the power supply apparatus 10 of the power supply system according to the first embodiment will be described in detail.

As shown in FIG. 1, the power supply apparatus 10 includes the driver 11, the digital control circuit 13, the coil L, the capacitor Co, the oscillator (OSC) 15, the A/D converter 17, a memory 19 and the comparator 21. The driver 11 is connected to the power source voltage Vcc and performs the ON/OFF operation. The digital control circuit 13 performs the ON/OFF control of the driver 11. The coil L controls the amount of current that flows to the driver 11. The capacitor Co is connected to the coil L and performs a rectification operation together with the coil L. The oscillator 15 outputs the oscillator signal for performing the ON/OFF control of the driver 11 every constant period such as the clock period of 1 MHz. The A/D converter 17 compares the output voltage Vout outputted from the connection node of the capacitor Co and the coil L with the predetermined threshold voltage VTH. The memory 19 supplies the threshold voltage VTH to the A/D converter 17. The comparator 21 detects the output current of the driver 11.

Also, the driver 11 has a switch element (not shown) and turns on/off the switch element. For example, the switch element may be configured by a CMOSFET (Complementary Metal Oxide Semiconductor Field Effect Transistor) including a P channel MOSFET whose drain is connected to the coil L and source is connected to the power source voltage Vcc, and an N channel MOSFET whose drain is connected to the coil L and source is connected to a ground potential.

The digital control circuit 13 operates in the normal control mode or the low power control mode. The normal control mode is a control mode in which the output operation of the oscillator signal by the oscillator 15 and the ON/OFF operation of the driver 11 are continuously activated. The low power control mode is a control mode in which the output operation of the oscillator signal by the oscillator 15 and the ON/OFF operation of the driver 11 are activated intermittently. Since the low power control mode intermittently activates the output operation of the oscillator signal by the oscillator 15 and the ON/OFF operation of the driver 11, the low power control mode can reduce the power consumption in comparison with the normal control mode.

The digital control circuit 13 sets to switch between the normal control mode and the low power control mode based on the current detected by the comparator 21, and controls the driver 11 and the oscillator 15 based on the set control mode.

Specifically, the digital control circuit 13 stops the output operation of the oscillator signal by the oscillator 15 and the ON/OFF operation of the driver 11 when the control mode is switched from the normal control mode to the low power control mode. Also, the digital control circuit 13 starts the ON/OFF operation of the driver 11 when the low power control mode is set and the output voltage Vout is determined to be equal to or less than the threshold voltage VTH by the comparison result of the A/D converter 17.

The A/D converter 17 also includes a low power function, which is switched from an n bit conversion to a 1 bit conversion when the control mode is switched from the normal mode to the low power mode. That is, the A/D converter 17 operates in an n bit mode (e.g., 10 bit mode), which performs the A/D conversion by n-bit (e.g., 10 bits), and a 1 bit mode, which compares the output voltage Vout with the threshold voltage VTH by 1-bit, as described later. The A/D converter 17 operates in the n bit mode when the normal control mode is set, and operates in the 1 bit mode when the low power control mode is set. That is, the A/D converter 17 becomes a comparator in the 1 bit mode.

Also, the digital control circuit 13 stops the output operation of the oscillator signal by the oscillator 15 and then activates the output operation after a lapse of a predetermined time, when the low power control mode is set.

Specifically, the digital control circuit 13 turns on the driver 11 immediately when the oscillator signal of the oscillator 15 is stopped and a lowered voltage condition (i.e., the condition that the output voltage Vout is equal to or less than the threshold voltage VTH) is detected by the A/D converter 17. When the driver 11 is activated for the predetermined time and the output value of the A/D converter 17 is reversed (i.e., the output voltage Vout becomes equal to or more than the threshold voltage VTH), the digital control circuit 13 turns off the driver 11. That is, the digital control circuit 13 activates the output operation of the oscillator signal of the oscillator 15 for the predetermined time, and stops the output operation when the output voltage VOUT is determined to be more than or equal to the threshold voltage VTH by the comparison result of the A/D converter 17. The ON/OFF operation may be repeated for the predetermined time.

When the low power control mode is set, the digital control circuit 13 activates the output operation and sets the normal control mode if the number of times that the output operation of the oscillator signal by the oscillator 15 is consecutively stopped reaches the predetermined consecutive repetitive number of times. That is, a control mode of the digital control circuit 13 is switched from the low power control mode to the normal control mode and a continuous operation is performed, when the number of times that the output operation of the oscillator signal by the oscillator 15 is consecutively stopped reaches the predetermined consecutive repetitive number of times.

Figure 2:
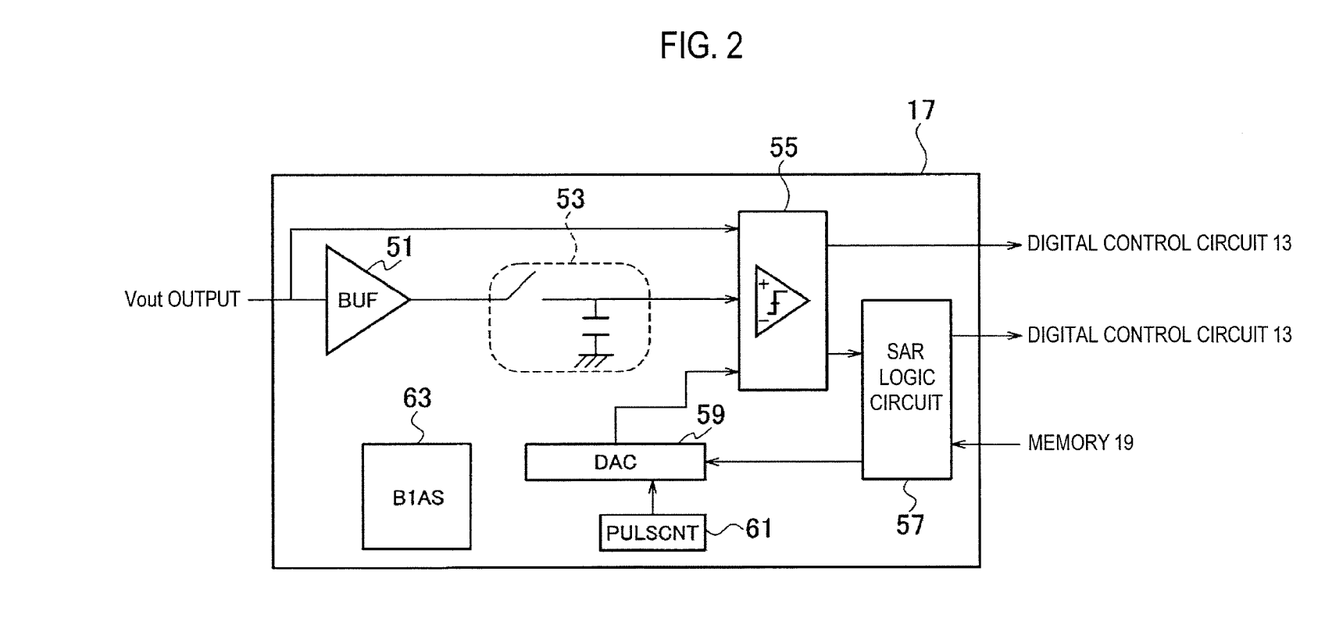
FIG. 2 is a schematic diagram showing a configuration of an A/D converter 17 included in a power supply apparatus of the power supply system according to the first embodiment.

FIG. 2 is a diagram showing the A/D converter 17 included in the power supply apparatus 10 of the power supply system 100 according to the first embodiment.

The A/D converter 17 operates in the n bit mode or the 1 bit mode. The A/D converter 17 compares the output voltage Vout outputted from the connection node of the capacitor CO and the coil L with the predetermined threshold voltage VTH in the 1 bit mode, when the low power control mode is set.

Specifically, as shown in FIG. 2, the A/D converter 17 includes a buffer (BUF) 51, an S/H circuit 53, a comparator unit 55, a successive approximation register (SAR) logic circuit 57, a digital to analog converter (DAC) 59, a pulse count generator (PULSCNT) 61 and a bias circuit 63. The BUF 51 temporarily stores the output voltage Vout. The S/H circuit 53 stores the output voltage Vout supplied from the BUF 51. The comparator unit 55 compares input values. The SAR logic circuit 57 temporarily stores the comparison result supplied from the comparator unit 55 and supplies the threshold voltage VTH supplied from the memory 19 to the DAC 59. The DAC 59 converts digital signals into analog signals. The PULSCNT 61 generates a pulse count.

The A/D converter 17 operates in the n bit mode (e.g., 10 bit mode), which performs the A/D conversion by the n-bit, and the 1 bit mode, which compares the output voltage Vout with the threshold voltage VTH by the 1-bit. The A/D converter 17 operates in the n bit mode (e.g., 10 bit mode) when the normal control mode is set, and operates in the 1 bit mode when the low power control mode is set.

Specifically, the A/D converter 17 performs the A/D conversion of the threshold voltage VTH by looping the comparator unit 55, the SAR logic circuit 57 and the DAC 59 about 10 times when the normal control mode is set (e.g., when operating in the 10 bit mode).

When the low power control mode is set (when operating in the 1 bit mode), the A/D converter 17 compares the output voltage Vout with the threshold voltage VTH by using the comparator unit 55, the DAC 59, the PULSCNT 61 and the bias circuit 63. Specifically, the threshold voltage VTH is supplied to the comparator unit 55 through the DAC 59, and the output voltage Vout is supplied to the comparator unit 55 from the BUF 51.

The comparator unit 55 compares the output voltage Vout with the threshold voltage VTH. The comparator unit 55 supplies an OFF signal to the digital control circuit 13 when the output voltage Vout exceeds the threshold voltage VTH. The comparator unit 55 supplies an ON signal to the digital control circuit 13 when the output voltage Vout is equal to or less than the threshold voltage VTH.

As describe above, since the A/D converter 17 operates to switch between the n bit mode (e.g., 10 bit mode), which performs the A/D conversion by the n-bit, and the 1 bit mode, which compares the output voltage Vout with the threshold voltage VTH by the 1-bit, it is possible to save hardware resources since internal components of the A/D converter 17 may be shared to realize the specification for switching between an A/D conversion function and a comparison function.

(Operation of the Power Supply Apparatus)

Next, the operation of the power supply apparatus 10 of the power supply system 100 according to the first embodiment will be described.

Figure 3:
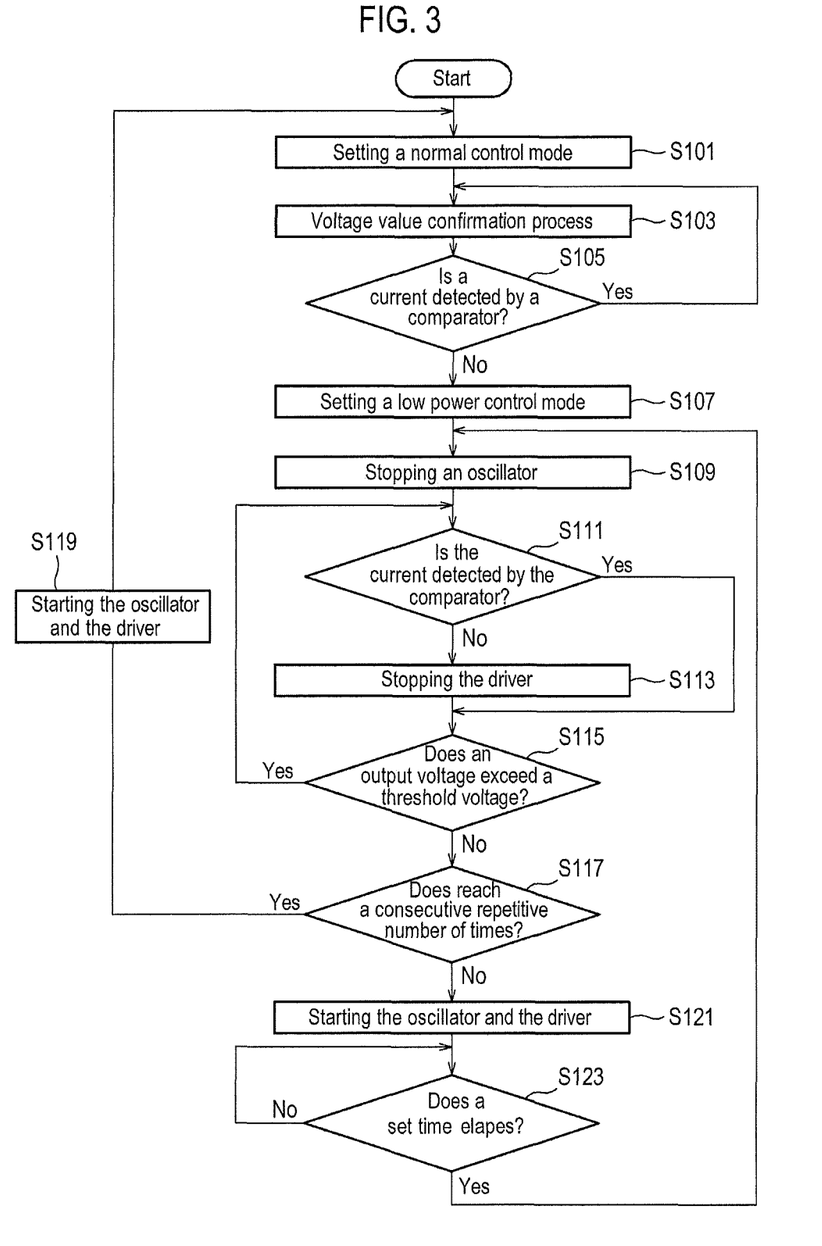
FIG. 3 is a flowchart showing a process procedure of the power supply apparatus of the power supply system according to the first embodiment.

FIG. 3 is a flowchart showing a process procedure by the power supply apparatus 10 of the power supply system 100 according to the first embodiment.

(a) As shown in FIG. 3, at first, the normal control mode is set when the power supply apparatus 10 is powered on (step S101). As a result, the output operation of the oscillator signal by the oscillator 15, and various operations of each component included in the power supply apparatus 10, for example the ON/OFF operation of the driver 11 and the like are continuously performed.

(b) Then, a voltage value confirmation process is performed (step S103). Herein, since the normal control mode is set, the A/D converter 17 confirms a voltage value, for example, in the 10 bit mode. That is, the A/D converter 17 converts an analog voltage value into a digital voltage value.

(c) Next, the comparator 21 determines whether or not the output current of the driver 11 is detected (step S105).

(d) In the step S105, if it is determined that the output current of the driver 11 is detected by the comparator 21, the process proceeds to the step S103.

(e) In the step S105, if it is determined that the output current of the driver 11 is not detected, that is, the current value falls to "0 (A)", the digital control circuit 13 sets the low power control mode as the control mode (step S107). As a result, the output operation of the oscillator signal by the oscillator 15 and the ON/OFF operation of the driver 11 are intermittently activated.

(f) When the low power control mode is set, the output operation of the oscillator signal by the oscillator 15 is stopped (step S109).

Then, the comparator 21 determines whether or not the output current of the driver 11 is detected (step S111).

(g) In the step S111, if it is determined that the output current of driver 11 is not detected by the comparator 21, that is, the current value falls to "0 (A)" (NO), the digital control circuit 13 stops the ON/OFF operation of the driver 11 (step S113).

(h) Then, it is determined whether or not the output voltage Vout exceeds the threshold voltage VTH (step S115). Specifically, since the low power control mode is set, the A/D converter 17 operates in the 1 bit mode to compare the output voltage Vout with the threshold voltage VTH by using the comparator unit 55, the DAC 59, the PULSCNT 61 and the bias circuit 63. The A/D converter 17 supplies the OFF signal to the digital control circuit 13 when the output voltage Vout exceeds the threshold voltage VTH, and supplies the ON signal to the digital control circuit 13 when the output voltage VOUT is equal to or less than the threshold voltage VTH.

(i) In the step S111, if it is determined that the output current of the driver 11 is detected, the process does not perform the step S113 and proceeds to the step S115.

(j) In the step S115, if it is determined that the output voltage Vout exceeds the threshold voltage VTH (YES), that is, the OFF signal is supplied to the digital control circuit 13, the process proceeds to the step S111.

(k) In the step S115, if it is determined that the output voltage Vout is equal to or less than the threshold value VTH (NO), that is, the ON signal is supplied to the digital control circuit 13, the digital control circuit 13 determines whether or not the number of times that the output operation has been consecutively stopped reaches the consecutive repetitive number of times (step S117). Herein, the consecutive repetitive number of times is an upper limit of the number of times that the output operation of the oscillator signal is executed by the oscillator 15, which operates intermittently, when the low power control mode is set. For example, the consecutive repetitive number of times may be set previously. That is, the consecutive repetitive number of times means the number of times that the output operation of the oscillator signal by the oscillator 15, which operates intermittently, is turned on only for the predetermined time is repeated consecutively. The set period of the low power control mode is determined by the consecutive repetitive number of times. Herein, the consecutive repetitive number of times is set as "3".

(l) In the step S117, if it is determined that the number of times the output operation is consecutively stopped reaches the consecutive repetitive number of the times (YES), the output operation of the oscillator signal by the oscillator 15 and the ON/OFF operation of the driver 11 are started (step S119).

(m) In the step S117, if it is determined that the number of times the output operation is consecutively stopped is equal to or less than the consecutive repetitive number of times (NO), the output operation of the oscillator signal by the oscillator 15 and the ON/OFF operation of the driver 11 are started (step S121), and then it is determined whether or not a set time elapses (step S123). The set time is a time between the start of the output operation of the oscillator signal of the oscillator 15 and the stop of the output operation of the oscillator signal of the oscillator 15, when the low power control mode is set. The set time is a predetermined time.

Figure 4:
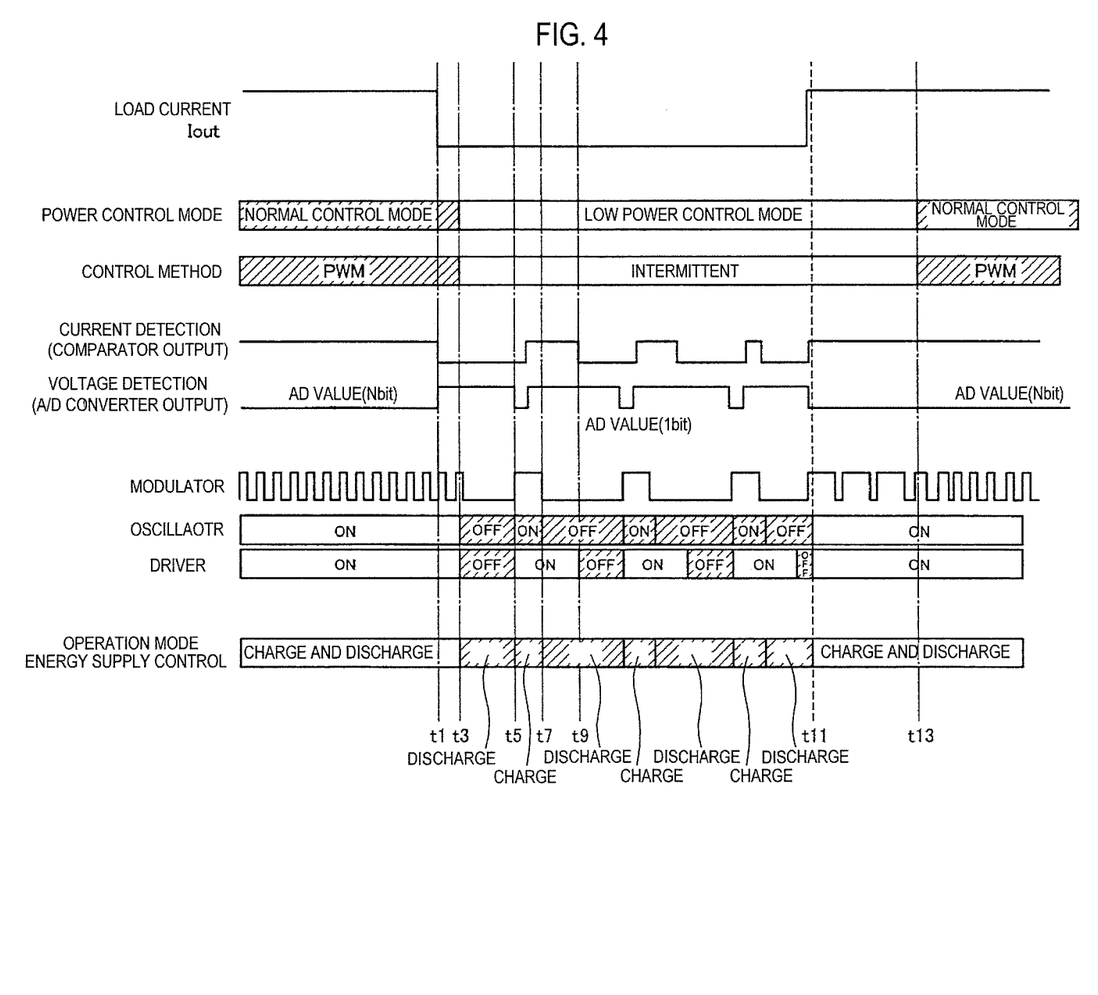
FIG. 4 is a timing chart of the power supply apparatus of the power supply system according to the first embodiment.

FIG. 4 is a timing chart of the power supply apparatus 10 of the power supply system 100 according to the first embodiment.

As shown in FIG. 4, when the output current of the driver 11 is not detected by the comparator 21, that is, the output signal of the comparator 21 becomes a low level at time t1, the control mode is switched from the normal control mode to the low power control mode at time t3.

As a result, the output operation of the oscillator signal by the oscillator 15 and the ON/OFF operation of the driver 11 are stopped. Since the power supply is stopped as the ON/OFF operation of the driver 11 is stopped, a self-discharge of the capacitor Co is started. Also, at time t3, the A/D converter 17 is switched from the 10 bit mode, which performs the A/D conversion by the 10-bit, to the 1 bit mode, which compares the output voltage Vout with the threshold voltage VTH by the 1-bit.

At time t5, when the output voltage Vout is equal to or less than the threshold voltage VTH and the output signal from the A/D converter 17, which operates in the 1 bit mode as the comparator, becomes a low level, the output operation of the oscillator signal of the oscillator 15 and the ON/OFF operation of the driver 11 are started. As a result, since the power supply resumes, the charge of the capacitor Co is started. When the output operation and the ON/OFF operation are started, the oscillator 15 and the driver 11 turn off (Nch: OFF) by an overflag of a count-up.

At time t7 that a predetermined time has elapsed from time t5, the output operation of the oscillator signal of the oscillator 15 is stopped.

At time t9, since the output signal from the comparator 21 becomes a low level, and the output voltage Vout exceeds the threshold voltage VTH, that is, the output signal from the A/D converter 17 becomes a high level, the ON/OFF operation of the driver 11 is stopped.

Since the consecutive repetitive number of times is set as "3" at time t11, it is determined that the number of times the output operation is consecutively stopped exceeds the consecutive repetitive number of times, and the output operation of the oscillator signal of the oscillator 15 and the ON/OFF operation of the driver 11 are started.

Then, the control mode of the digital control circuit 13 is switched from the low power control mode to the normal control mode at time t13. As a result, the output operation of the oscillator signal by the oscillator 15, and various operations of each component included in the power supply apparatus 10, for example the ON/OFF operation of the driver 11 and the like are continuously performed.

According to the power supply apparatus 10 of the first embodiment, the digital control circuit 13 operates in the normal control mode and in the low power control mode, sets to switch between the normal control mode and the low power control mode based on the current detected by the comparator 21, and controls the driver 11 and the oscillator 15 based on the set control mode. Therefore, it is possible to reduce the power consumption for the period when the power supply apparatus 10 operates in the low power control mode. For example, when the power consumption in the normal control mode is 1 (mW), it is possible to reduce the power consumption up to about 100 (μW) in the low power control mode.

Also, when the power consumption of the load 16 is small, it is possible to performs the control in the low power control mode and reduce the ratio of the power consumption of the power supply apparatus 10 to the power consumption of the load 16.

Further, since the digital control circuit 13 performs the control operations, it is possible to easily adjust various settings such as a ripple voltage and the switching frequency according to the specifications of the load 16.

According to the first embodiment, it is possible to provide the power supply device, the power supply system and the power supply method, which can execute an adjustment setting merely with a digital setting (change of parameter or software) and eliminate the need for a redesign according to the specifications or the environment of the equipment to which power is supplied without lowering the efficiency even when a small power is supplied.

Second Embodiment

The power supply apparatus 10 of the first embodiment includes the A/D converter for switching the n bit mode (10 bit mode), which operates in the n-bit (e.g., 10-bit), and the 1 bit mode, which operates in the 1-bit. However, it should be noted herein that the power supply apparatus 10 may not be limited thereto.

Figure 5:
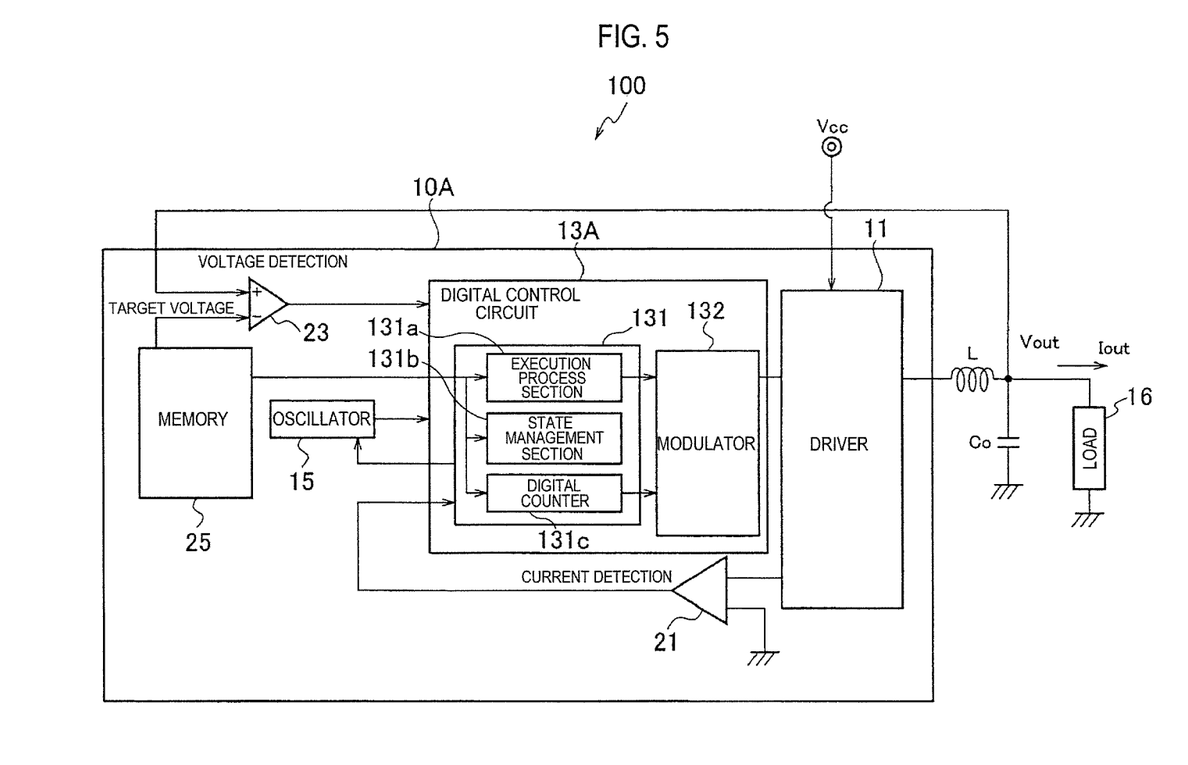
FIG. 5 is a schematic diagram showing a configuration of a power supply system according to a second embodiment.

FIG. 5 is a diagram showing a configuration of a power supply system 100 according to a second embodiment. In the second embodiment, a power supply apparatus 10A, which compares an output voltage Vout with a threshold voltage VTH by a comparator 23 and further adjusts a switching frequency, will be described.

(Configuration of Power Supply System)

As shown in FIG. 5, the power supply system 100 according to the second embodiment includes the power supply apparatus 10A, a coil L, a capacitor Co and a load 16. For example, the power supply apparatus 10A is a switching power source apparatus. The coil L is connected to the power supply apparatus 10A. The capacitor Co is connected to the coil L. A power source voltage Vcc is inputted to the power supply apparatus 10A as an input power source voltage, and an output voltage Vout is outputted from a connection node of the capacitor Co and the coil L.

The power supply apparatus 10 is connected to the load 16 to supply power to the load 16. The load 16 may be, for example, a mobile device including a cellular phone, a smart-phone, a personal digital assistant (PDA), an optical disk apparatus, a digital camera, a wireless communication apparatus and the like, or components thereof.

The power supply apparatus 10A includes a driver 11, an oscillator 15, a digital control circuit 13A and a digital counter 131c. The driver 11 is connected to the power source voltage Vcc and performs an ON/OFF operation of the power supply to the load 16. The oscillator 15 outputs an oscillator signal every constant period. The digital control circuit 13A performs an ON/OFF control of the driver 11 based on the oscillator signal outputted from the oscillator 15. The digital counter 131c counts the oscillator signal outputted from the oscillator 15. The digital control circuit 13A sets a threshold value, which represents an upper limit of a count value counted by the digital counter 131c. Then, the digital control circuit 13A stops the output operation of the oscillator signal by the oscillator 15 when the count value counted by the digital counter 131c exceeds the set threshold value.

Also, the power supply apparatus 10A further includes the comparator 23. The comparator 23 compares the output voltage Vout outputted from the connection node of the coil L, which is current controlled by the driver 11, and the capacitor Co, which is connected to the coil L, with the predetermined threshold voltage VTH. The digital control circuit 13A starts the output operation of the oscillator signal by the oscillator 15 when the output voltage Vout is equal to or less than the threshold voltage VTH when compared by the comparator 23.

The power supply apparatus 10A further includes a memory 25 for storing a threshold value CTH, which is set by an external input. The digital control circuit 13A reads the threshold value CTH stored in the memory 25. Further, the digital control circuit 13A stops the output operation of the oscillator signal by the oscillator 15, when the count value counted by the digital counter 131c exceeds the threshold value CTH and the output voltage $V_{OUT}$ is equal to or more than the threshold voltage VTH by the comparison result of the comparator 23.

(Detail Configuration of Power Supply Apparatus 10A)

The configuration of the power supply apparatus 10A of the power supply system 100 according to the second embodiment will be described in detail.

As shown in FIG. 5, the power supply apparatus 10A includes the driver 11, the digital control circuit 13A, the coil L, the capacitor Co, the oscillator (OSC) 15, the comparator 23, the memory 25 and the comparator 21. The driver 11 is connected to the power source voltage Vcc and performs the ON/OFF operation. The digital control circuit 13A performs the ON/OFF control of the driver 11. The coil L controls the amount of current that flows to the driver 11. The capacitor Co is connected to the coil L and performs a rectification operation together with the coil L. The oscillator 15 outputs the oscillator signal for performing the ON/OFF control of the driver 11 to the digital control circuit 13A every constant period. The comparator 23 compares the output voltage Vout outputted from the connection node of the capacitor Co and the coil L with the predetermined threshold voltage VTH. The memory 25 supplies the threshold voltage VTH to the comparator 23. The comparator 21 detects the output current of the driver 11.

Among these configurations, the configurations except the memory 25, the comparator 23 and the digital control circuit 13A are the same as those of the power supply apparatus 10 according to the first embodiment and will not be described.

The memory 25 stores the threshold voltage VTH to be supplied to the comparator 23, and the threshold value CTH for determining a switching frequency of the charge and discharge, as described later.

The comparator 23 compares the output voltage Vout outputted from the connection node of the capacitor Co and the coil L with the threshold voltage VTH supplied from the memory 25. The comparator 23 supplies an OFF signal to the digital control circuit 13A when the output voltage Vout exceeds the threshold voltage VTH and supplies an ON signal to the digital control circuit 13A when the output voltage $V_{OUT}$ is equal to or less than the threshold voltage VTH.

The digital control circuit 13A includes an operation unit 131 and a modulation unit 132.

The modulation unit 132 modulates a signal supplied from the operation unit 131 to generate a control signal. The modulation unit 132 supplies the control signal to the driver 11.

The operation unit 131 further includes an execution process section 131a, a state management section 131b and the digital counter 131c.

The execution process section 131a performs an execution process including various determination processes. The determination process may include a process of stabilizing the output voltage Vout (normal mode).

The state management section 131b manages a state of respective components. Specifically, the state management section 131b performs management operations as described below.

(1) The state management section 131b performs the management of switching from the normal control mode to the low power control mode by the detection of the comparator 21.

(2) The state management section 131b performs the management of switching between a continuous mode and a stop mode of the oscillator 15 by the detection of the comparator 21 and a consecutive repetition management of a count state when a count-up/over is detected in the low power control mode.

(3) The state management section 131b performs the management of switching from the low power control mode to the normal control mode.

(4) The state management section 131b manages the state of driver 11 in the OFF mode by the detection of the comparator 21 in the self-discharge mode. The state management section 131b performs (a charge mode Pch: ON, Nch: OFF; a discharge mode Pch: OFF, Nch: ON, but Pch: OFF, Nch: OFF in the detection state of the comparator 21) and the ON/OFF state management of the driver 11 in the respective modes.

More specifically, the state management section 131b reads from the memory 19 the threshold value CTH representing the upper limit of the count value C counted by the digital counter 131c to set the read threshold value CTH. The state management section 131b determines whether or not the count value C counted by the digital counter 131c exceeds the set threshold value CTH. Herein, the threshold value CTH may be a predetermined value. The switching frequency of the charge and discharge is determined by the threshold value CTH.

Also, the state management section 131b sets to switch between the normal control mode and the low power control mode based on the current detected by the comparator 21. Further, the state management section 131b performs the management of the count-up by the digital counter 131c.

The state management section 131b stops the output operation of the oscillator signal by the oscillator 15 when the count value C exceeds the set threshold value CTH and the output voltage Vout is equal to or more than the threshold voltage VTH by the comparison result of the comparator 23. Further, the state management section 131b continues the output operation of the oscillator signal by the oscillator 15 and resets the count value C when the count value C exceeds the set threshold value CTH and the output voltage Vout is equal to or less than the threshold voltage VTH when compared by the comparator 23.

The state management section 131b stops the output operation of the oscillator signal by the oscillator 15 and stops the ON/OFF operation of the driver 11 (Pch: OFF, Nch: ON). As a result, since the coil L enters into the self-discharge state (discharge state of coil L) and the power consumption by the load 16 is small, the current is reduced by counter electromotive force of the coil L. The ON/OFF operation of the driver 11 is completely stopped (Pch: OFF, Nch: OFF) if it is determined that the current value is "0" A by the comparator 21.

The digital counter 131c counts the oscillator signal supplied from the oscillator 15.

(Operation of Power Supply Apparatus 10A)

The operation of the power supply apparatus 10A of the power supply system 100 according to the second embodiment will be described.

Figure 6:
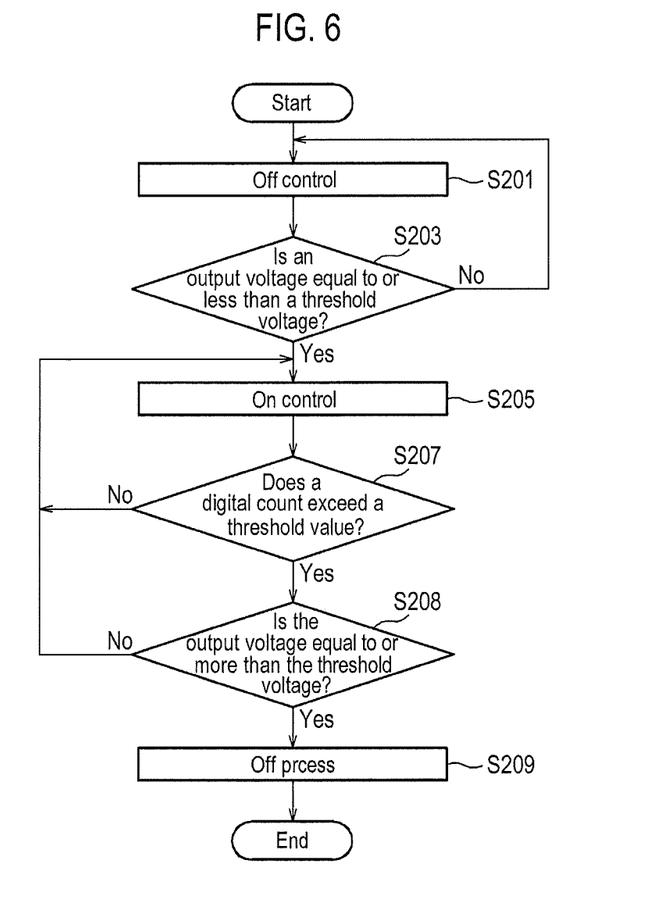
FIG. 6 is a flowchart showing a process procedure of a power supply apparatus the power supply system according to the second embodiment.

FIG. 6 is a flowchart showing a process procedure of the power supply apparatus 10A of the power supply system 100 according to the second embodiment.

(a) As shown in FIG. 6, the power supply apparatus 10A performs an OFF control (step S201). Specifically, the output operation of the oscillator signal by the oscillator 15 is stopped.

(b) Then, the state management section 131b of the digital control circuit 13A determines whether or not the output voltage Vout is equal to or less than the threshold voltage VTH (step S203). In the step S203, if it is determined that the output voltage Vout is equal to or less than the threshold voltage VTH (YES), the state management section 131b of the digital control circuit 131A performs an ON control. Specifically, the state management section 131b starts the output operation of the oscillator signal by the oscillator 15, the count operation of the digital counter 131c and the ON/OFF operation of the driver 11.

(c) Next, the state management section 131b of the digital control circuit 13A determines whether or not the count value C counted by the digital counter 131c exceeds the threshold value CTH (step S207).

(d) In the step S207, if it is determined that the count value C exceeds the threshold value CTH (YES), the state management section 131b determines whether or not the output voltage Vout is equal to or more than the threshold voltage VTH (step S208).

(e) In the step S208, if it is determined that the output voltage Vout is equal to or more than the threshold voltage VTH (YES), the state management section 131b performs the OFF process (step S209). Specifically, the state management section 131b stops the output operation of the oscillator signal by the oscillator 15 and stops the ON/OFF operation of the driver 11 (Pch: OFF, Nch: ON). As a result, since the coil L enters into the self-discharge state (discharge state of coil L) and the power consumption by the load 16 is small, the current is reduced by the counter electromotive force of the coil L, and the ON/OFF operation of the driver 11 is completely stopped (Pch: OFF, Nch: OFF) when it is determined that the current value by the comparator 21 is "0" A. Thus, the capacitor Co comes to a complete self-discharge state.

Figure 7:
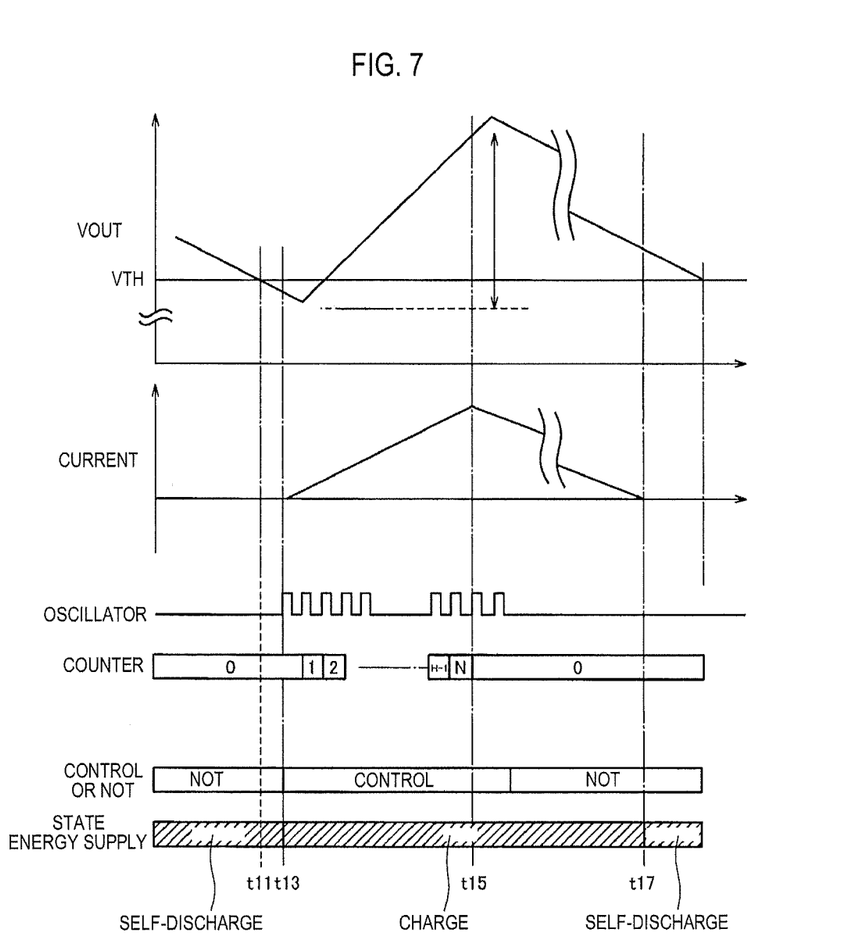
FIG. 7 is a timing chart of the power supply apparatus of the power supply system according to the second embodiment.

FIG. 7 is a timing chart of the power supply apparatus 10A of the power supply system 100 according to the second embodiment.

As shown in FIG. 7, when the output voltage Vout is equal to or less than the threshold voltage VTH at time t1, the output operation of the oscillator by the oscillator 15 and the like are initiated at time t3. That is, the output operation is performed immediately. As a result, the current is detected by the comparator 21, and the capacitor Co begins to be charged.

From time t3, the digital counter 131c starts the count of the oscillator signal supplied from the oscillator 15.

At time t15, if it is determined that the count value C exceeds the threshold value CTH by the state management section 131b, the state management section 131b promptly stops the output operation of the oscillator signal by the oscillator 15.

As a result, the output current of the driver 11 decreases since the driver 11 is stopped, and the self-discharge of the capacitor Co is started when the output current becomes "0" at time t17.

In this way, the threshold value CTH is set in advance and the switching frequency of the charge and discharge is determined.

As described above, according to the power supply apparatus 10 of the power supply system 100 of the second embodiment, it is possible to change a charge and discharge pulse interval, that is, the switching frequency of the charge and discharge by changing the threshold value, since the digital control circuit 13A sets the upper limit of the count value counted by the digital counter 131c. The power supply apparatus 10 of the power supply system 100 stops the output operation of the oscillator signal by the oscillator 15 when the count value counted by the digital counter 131c exceeds the set threshold value.

As a result, since various settings such as the switching frequency and the like can be easily adjusted according to the specifications of the load 16, for example, even after implementing the power supply apparatus 10A, an adjustment for supplying a required power can be easily performed to according to the specifications of the equipment to which power is supplied by changing the threshold value. Therefore, there is no need to perform a redesign or develop any additional device when the specifications of the equipment to which power is supplied are changed.

Also, according to the power supply apparatus 10A of the power supply system 100 of the second embodiment, since the output operation of the oscillator signal by the oscillator 15 is stopped when the count value counted by the digital counter 131c exceeds the set threshold value, it is possible to reduce the power consumption of the driver 11 and the oscillator 15.

Further, the power supply apparatus 10A adjusts the switching frequency in the second embodiment. However it should be noted herein that the power supply apparatus 10A may not be limited thereto. For example, the power supply apparatus 10A may be any apparatus capable of adjusting a setting in the digital control such as a ripple voltage.

Further, the power supply apparatus 10A compares the output voltage Vout with the threshold voltage VTH by the comparator 23 and adjusts the switching frequency in the second embodiment. Alternatively, it may be instead configured to include the A/D converter 17 described in the first embodiment.

Further, as described in the first embodiment, it is also possible to switch between the normal control mode and the low power control mode. Specifically, the power supply apparatus 10A may include the driver 11, the oscillator 15, the digital control circuit 13A, the digital counter 131c and the comparator 21. The driver 11 is connected to the power source voltage and performs the ON/OFF operation of the power supply. The oscillator 15 outputs the oscillator signal every constant period. The digital control circuit 13A performs the ON/OFF control of the driver 11 based on the oscillator signal outputted from the oscillator 15. The digital counter 131c counts the oscillator signal outputted from the oscillator 15. The comparator 21 detects the output current of the driver 11. The digital control circuit 13A may operate in the normal control mode for continuously actuating the output operation of the oscillator signal by the oscillator 15 and the ON/OFF operation of the driver 11, and in the low power control mode for intermittently actuating the output operation of the oscillator signal by the oscillator 15 and the ON/OFF operation of the driver 11. When the threshold value CTH representing the upper limit of the count value C counted by the digital counter 131C and the low power control mode is set and the count value C counted by the digital counter 131c exceeds the set threshold value CTH, the digital control circuit 13A may stop the output operation of the oscillator signal by the oscillator 15.

As a result, since the output operation of the oscillator signal by the oscillator 15 is stopped when the low power control mode is set, it is possible to reduce the power consumption and change the charge and discharge pulse interval, that is, the switching frequency of the charge and discharge by changing the threshold value. Therefore, an adjustment for supplying required power can be easily performed according to the specifications of the equipment to which power is supplied.

Also, the digital control circuit 13A may set to switch between the normal control mode and the low power control mode based on the current detected by the comparator 21 and control the driver 11 and the oscillator 15 based on the set control mode.

Further, in the second embodiment, the power supply apparatus 10A includes the digital control circuit 13A, which reads the threshold value CTH stored in the memory 25 and stops the output operation of the oscillator signal by the oscillator 15 when the count value C counted by the digital counter 131c exceeds the read threshold value CTH. However, it should be noted herein that the power supply apparatus 10A may not be limited thereto.

The power supply apparatus 10A may include a communication interface for communicating with an external terminal, which stores the threshold value CTH. Further, the digital control circuit 13A may receive the threshold value CTH from the external terminal through a communication interface and stop the output operation of the oscillator signal by the oscillator 15 when the count value C counted by the digital counter 131c exceeds the received threshold value CTH.

According to the second embodiment, it is possible to provide a power supply method, comprising: an oscillation step of outputting an oscillator signal every constant period; a digital control step of performing an ON/OFF operation of power supply to a load based on the oscillator signal outputted in the oscillation step; and a count step of counting the oscillator signal outputted in the oscillation step. In the digital control step, a threshold value representing an upper limit of a count value counted in the count step is set, and the output operation of the oscillator signal in the oscillation step is stopped when the count value counted in the count step exceeds the set threshold value.

According to the second embodiment, it is possible to provide the power supply device, the power supply system and the power supply method, which can execute an adjustment setting merely with a digital setting (change of parameter or software) and eliminate the need for a redesign according to the specifications or the environment of the equipment to which power is supplied. The above mentioned power supply system can adjust setting without lowering the efficiency even when a small power is supplied.

As describe above, according to the present disclosure, it is possible to provide the power supply apparatus, the power supply system and the power supply method, which can be easily adjusted according to the equipment to which power is supplied.

Other Embodiment

Although the embodiments of the present disclosure have been described in the above, it should be understood that the description and the drawings which constitutes a part of the present disclosure do not limit the spirit of the present disclosure. Various alternative embodiments and operation techniques of the present disclosure are apparent to those skilled in the art.

It goes without saying that the present disclosure embraces many different embodiments not disclosed herein. Accordingly, the technical scope of the present disclosure is decided by only the subject matters defined in the claims.

In an apparatus for performing a DC power conversion, the power supply apparatus of the present disclosure may be applied to a power conversion apparatus such as a switching power source apparatus for controlling electric power supplied to the load by the ON/OF control of a switching element included therein.

According to the present disclosure, it is possible to provide the power supply device, the power supply system and the power supply method, which can execute an adjustment setting merely with a digital setting (change of parameter or software) and eliminate the need for a redesign according to the specifications or the environment of the equipment to which power is supplied without lowering the efficiency even when a small power is supplied.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A power supply apparatus comprising:
   a driver connected to a power source voltage and configured to perform an ON/OFF operation of supplying power to a load;
   an oscillator configured to output an oscillator signal;
   a digital control circuit configured to perform an ON/OFF control of the driver based on the oscillator signal outputted from the oscillator; and
   a counter configured to count the oscillator signal outputted from the oscillator,
   wherein the digital control circuit is configured to set a threshold value representing an upper limit of a count value counted by the counter and to stop an output operation of the oscillator when the count value counted by the counter exceeds the threshold value,
   wherein the digital control circuit operates in a normal control mode for continuously actuating the output operation of the oscillator and the ON/OFF control of the driver and in a low power control mode for intermittently actuating the output operation of the oscillator and intermittently actuating the ON/OFF control of the driver, and
   wherein the digital control circuit is configured to stop the output operation of the oscillator if the count value counted by the counter exceeds the threshold value when the digital control circuit operates in the low power control mode.

2. The power supply apparatus of claim 1, further comprising:
   a comparator configured to compare an output voltage outputted from an output node of a coil connected to the driver with a predetermined threshold voltage, the output node of the coil being connected to a capacitor,
   wherein the digital control circuit is configured to start the output operation of the oscillator when the comparator determines that the output voltage is equal to or less than the predetermined threshold voltage.

3. The power supply apparatus of claim 1, further comprising:
   a memory configured to store the threshold value set by an external input,
   wherein the digital control circuit is configured to read the threshold value stored in the memory and to stop the output operation of the oscillator when the count value counted by the counter exceeds the threshold value.

4. The power supply apparatus of claim 1, further comprising:
   a communication interface configured to communicate with an external terminal storing the threshold value,
   wherein the digital control circuit is configured to receive the threshold value from the external terminal, and to stop the output operation of the oscillator when the count value counted by the counter exceeds the threshold value.

5. The power supply apparatus of claim 1, further comprising:
   a current detector configured to detect an output current of the driver,
   wherein the digital control circuit is configured to set to switch between the normal control mode and the low power control mode based on the current detected by the current detector.

6. A power supply system, comprising:
   supply apparatus according to claim 1; and
   a load to which power from the power supply apparatus is supplied.

7. A power supply method, comprising:
   outputting an oscillator signal;
   performing an ON/OFF operation of supplying power to a load based on the oscillator signal; and
   counting the oscillator signal,
   wherein performing the ON/OFF operation of supplying power to a load includes:
   continuously actuating an output operation of the oscillator and an ON/OFF control of the driver in a normal control mode;
   intermittently actuating the output operation of the oscillator and intermittently actuating the ON/OFF control of the driver in a low power control mode;
   setting a threshold value representing an upper limit of a count value for counting the oscillator signal; and
   stopping an output operation of the oscillator when the count value exceeds the threshold value.

8. The power supply apparatus of claim 2, further comprising:
   the digital control circuit is configured to repeat the output operation of the oscillator if the output voltage is less than the predetermined threshold voltage when the count value counted by the counter exceeds the threshold value.

9. A power supply apparatus comprising:
   a driver connected to a power source voltage and configured to perform an ON/OFF operation of supplying power to a load;

an oscillator configured to output an oscillator signal;

a digital control circuit configured to perform an ON/OFF control of the driver based on the oscillator signal outputted from the oscillator, a counter configured to count the oscillator signal outputted from the oscillator; and a comparator configured to compare an output voltage outputted from an output node of a coil connected to the driver with a predetermined threshold voltage, the output node of the coil being connected to a capacitor, wherein the digital control circuit is configured to start an output operation of the oscillator and to have the counter start to count when the comparator determines that the output voltage is equal to or less than the predetermined threshold voltage, wherein the digital control circuit is configured to set a threshold value representing an upper limit of a count value counted by the counter and to stop the output operation of the oscillator when the count value counted by the counter exceeds the threshold value.

10. The power supply apparatus of claim 9, further comprising:

a memory configured to store the threshold value set by an external input, wherein the digital control circuit is configured to read the threshold value stored in the memory and to stop the output operation of the oscillator when the count value counted by the counter exceeds the threshold value.

11. The power supply apparatus of claim 9, further comprising:

the digital control circuit is configured to repeat the output operation of the oscillator if the output voltage is less than the predetermined threshold voltage when the count value counted by the counter exceeds the threshold value.

* * * * *